United States Patent
Zha

(10) Patent No.: US 10,225,215 B2
(45) Date of Patent: Mar. 5, 2019

(54) METHOD AND SYSTEM FOR CACHING INPUT CONTENT

(71) Applicant: TENCENT TECHNOLOGY (SHENZHEN) COMPANY LIMITED, Shenzhen, Guangdong (CN)

(72) Inventor: Wen Zha, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 244 days.

(21) Appl. No.: 15/165,598

(22) Filed: May 26, 2016

(65) Prior Publication Data
US 2016/0277327 A1 Sep. 22, 2016

Related U.S. Application Data

(63) Continuation of application No. PCT/CN2015/071778, filed on Jan. 28, 2015.

(30) Foreign Application Priority Data

Jun. 20, 2014 (CN) .......................... 2014 1 0281089

(51) Int. Cl.
*G06Q 10/10* (2012.01)
*H04L 12/58* (2006.01)
*H04L 29/08* (2006.01)

(52) U.S. Cl.
CPC ........... *H04L 51/04* (2013.01); *G06Q 10/107* (2013.01); *H04L 51/046* (2013.01); *H04L 51/32* (2013.01); *H04L 51/34* (2013.01); *H04L 67/2842* (2013.01)

(58) Field of Classification Search
CPC ....... H04L 51/04; H04L 51/046; H04L 51/32; H04L 51/34; H04L 67/2482; G06Q 10/107

(Continued)

(56) References Cited

U.S. PATENT DOCUMENTS 8,255,473 B2   8/2012   Eren
8,346,864 B1 * 1/2013   Amidon .............. H04L 65/1069
                                                         709/204

(Continued)

FOREIGN PATENT DOCUMENTS

CN   102662570 A   9/2012
CN   104142784 A   11/2014

OTHER PUBLICATIONS

Robjulo, Gmail App Frustrations, Jul. 26, 2013, https://forums.androidcentral.com/general-help-how/300121-gmail-app-frustrations.html.*

(Continued)

*Primary Examiner* — James E Springer
(74) *Attorney, Agent, or Firm* — Baker & Hostetler LLP

(57) ABSTRACT

Method and device of managing chat messages in a social network application are provided. The method includes: a user device providing a chat interface for a chat session between a first user and a second user, the chat interface including a first region for displaying past chat messages, and a second region for receiving a current message input; receiving a first message input from the first user in the second region; receiving a first incoming message from the second user; displaying the first incoming message in the first region; and automatically, without user intervention, presenting an option to the first user for caching the first message input; receiving an input caching instruction from the first user regarding the first message input; and storing the first message input.

17 Claims, 19 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 9,906,471 | B1* | 2/2018 | Rensburg | H04L 51/04 |
| 9,954,806 | B2* | 4/2018 | Claux | G06F 17/211 |
| 2004/0015548 | A1* | 1/2004 | Lee | H04L 12/1827 |
| | | | | 709/204 |
| 2004/0168610 | A1 | 8/2004 | Davis | |
| 2005/0149621 | A1* | 7/2005 | Kirkland | H04L 51/04 |
| | | | | 709/207 |
| 2006/0210034 | A1* | 9/2006 | Beadle | G06Q 10/107 |
| | | | | 379/88.22 |
| 2007/0233801 | A1* | 10/2007 | Eren | G06Q 10/107 |
| | | | | 709/207 |
| 2008/0208984 | A1* | 8/2008 | Rosenberg | G06Q 10/107 |
| | | | | 709/206 |
| 2009/0176521 | A1* | 7/2009 | Klassen | H04L 51/16 |
| | | | | 455/466 |
| 2009/0216836 | A1* | 8/2009 | Haynes | G06Q 10/107 |
| | | | | 709/204 |
| 2010/0241700 | A1* | 9/2010 | Rasmussen | G06Q 10/107 |
| | | | | 709/203 |
| 2011/0191429 | A1* | 8/2011 | Tu | G06F 15/16 |
| | | | | 709/206 |
| 2011/0258561 | A1* | 10/2011 | Ladouceur | G06Q 10/103 |
| | | | | 715/753 |
| 2012/0210334 | A1* | 8/2012 | Sutedja | G06Q 10/107 |
| | | | | 719/314 |
| 2012/0272161 | A1 | 10/2012 | Eren | |
| 2015/0256495 | A1* | 9/2015 | Claux | G06F 17/211 |
| | | | | 715/752 |
| 2018/0063040 | A1* | 3/2018 | Rensburg | H04L 51/04 |
| 2018/0241710 | A1* | 8/2018 | Claux | G06F 17/211 |

OTHER PUBLICATIONS

Iowa State University, Blackboard Learn: Using "Save as Draft" in Discussions, Mar. 2013, https://www.hs.iastate.edu/tipsbb/Discussions/savedraft.pdf.*
International Search Report in international application No. PCT/CN2015/071778, dated Apr. 28, 2015.
English Translation of the Written Opinion of the International Search Authority in international application No. PCT/CN2015/071778, dated Apr. 28, 2015.
Notification of the First Office Action of Chinese application No. 201410281089.3, dated Sep. 30, 2016.

* cited by examiner

Server System 108

METHOD AND SYSTEM FOR CACHING INPUT CONTENT

CROSS REFERENCE TO RELATED APPLICATION

This is a continuation application of International Patent Application No. PCT/CN2015/071778, filed on Jan. 28, 2015, which claims priority to Chinese Patent Application No. 201410281089.3, entitled "METHOD AND APPARATUS FOR TEMPORARILY STORING INPUT CONTENT" filed on Jun. 20, 2014, which are incorporated herein by reference in their entirety.

FIELD OF THE TECHNOLOGY

The present application relates to network application processing technologies, and in particular, to a temporary storage method and apparatus for input content.

BACKGROUND OF THE TECHNOLOGY

With the development of various network applications, users increasingly perform various content input operations by using network applications, so as to facilitate sending of various messages. For example, in a process of using an instant messaging tool, various content input operations are implemented by using an input interface provided by the instant messaging tool.

However, during conversations, it is often occurred that one person sends multiple messages on different topics, while the other is overwhelmed by the multiple messages and topics. In addition, the messages are often chronically displayed, without showing the corresponding relationships among messages.

SUMMARY

In light of the issues associated with the conventional chronological presentation of messages based on the arrival times of the messages, the present disclosure provides a method that allows users to respond to incoming messages one by one by displays incoming messages and the responding messages in a way showing their associations with each other. In addition, in some embodiments, message input for one or more outgoing messages can be cached by the user and retrieved later when the user is ready to continue with the message input and sending the messages. In accordance with some implementations of the disclosed technology, a method of managing chat messages in a social network application is disclosed. The method is performed at a user device (e.g., a client device 140 in FIGS. 1 and 3) in some embodiments. The method includes: providing a chat interface for a chat session between a first user and a second user, the chat interface including a first region for displaying past chat messages (if there is any) from each of the first and the second user, and a second region for receiving a current message input from the first user; receiving a first message input from the first user in the second region; after receiving the first message input and before receiving any message release instruction from the first user regarding the first message input, receiving a first incoming message from the second user; in response to receiving the first incoming message: displaying the first incoming message in the first region; and automatically, without user intervention, presenting an option to the first user for caching the first message input; in response to presenting the option for caching the first message input, receiving an input caching instruction from the first user regarding the first message input; and in response to receiving the input caching instruction: storing the first message input; and removing the first message input from the second region to enable receipt of a new message input from the first user.

In another aspect, a device (e.g., a client device 140 in FIGS. 1 and 3) comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device (e.g., a client device 140 in FIGS. 1 and 3), cause the device to perform the method described above.

Although many aspects of the method is described from the perspective of a client device of a first user. Corresponding aspects and actions of the client device of the other user(s) in the chat conversation as well as the aspects and actions of the server will be apparent in light of the descriptions provided herein to a person ordinarily skilled in the art and within the scope of the present disclosure and claims.

BRIEF DESCRIPTION OF THE DRAWINGS

The aforementioned features and advantages of the technology as well as additional features and advantages thereof will be more clearly understood hereinafter as a result of a detailed description of preferred embodiments when taken in conjunction with the drawings.

Like reference numerals refer to corresponding parts throughout the several views of the drawings.

The aforementioned features and advantages of the technology as well as additional features and advantages thereof will be more clearly understood hereinafter as a result of a detailed description of preferred embodiments when taken in conjunction with the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application more comprehensible, the present application is described in further detail below with reference to the accompanying drawings and embodiments. It should be understood that, the specific embodiments described herein are only used for explaining the present application instead of limiting the present application.

Figure 1:
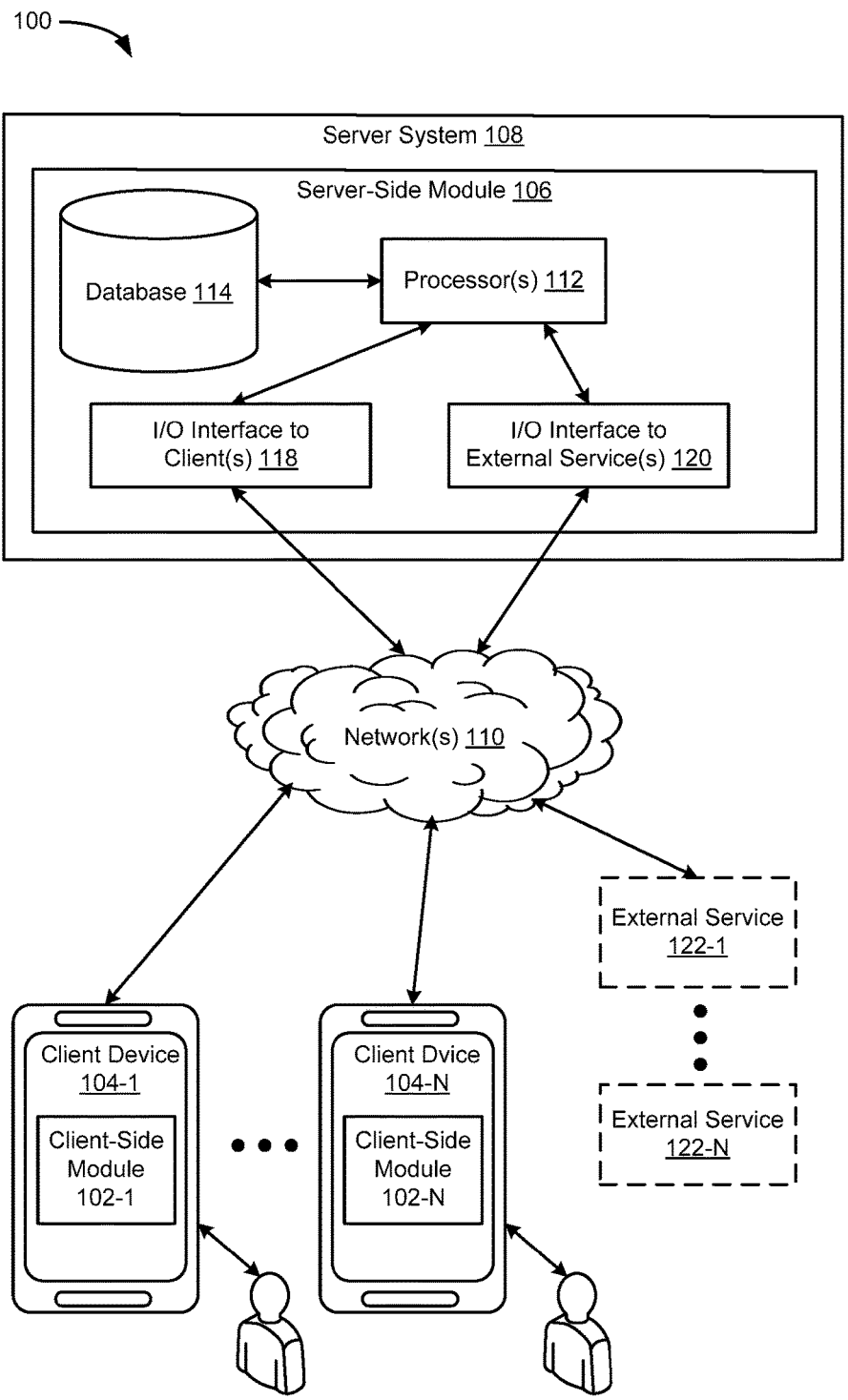
FIG. 1 is a block diagram of a server-client environment in accordance with some embodiments.

As shown in FIG. 1, managing chat messages is implemented in a server-client environment 100 in accordance with some embodiments. In some embodiments, server-client environment 100 includes client-side processing 102-1 . . . 102-N (hereinafter "client-side module 102") executed on a client device 104-1 . . . 104-N, and server-side processing 106 (hereinafter "server-side module 106") executed on a server system 108. Client-side module 102 communicates with server-side module 106 through one or more networks 110. Client-side module 102 provides client-side functionalities for the social networking platform (e.g., instant messaging, and social networking services) and communications with server-side module 106. Server-side module 106 provides server-side functionalities for the social networking platform (e.g., instant messaging, and social networking services) for any number of client modules 102 each residing on a respective client device 104.

In some embodiments, server-side module 106 includes one or more processors 112, one or more databases 114, an I/O interface to one or more clients 118, and an I/O interface to one or more external services 120. I/O interface to one or more clients 118 facilitates the processing of input and output associated with the client devices for server-side module 106. One or more processors 112 obtain instant messages from a plurality of users, process the instant messages, and share message information of the client device to client-side modules 102 of one or more client devices. The database 114 stores various information, including but not limited to, messages in various formats, service categories and service provider names. The database 114 may also store a plurality of record entries relevant to the users associated with managing chat messages. I/O interface to one or more external services 120 facilitates communications with one or more external services 122 (e.g., merchant websites, credit card companies, and/or other processing services).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Server-client environment 100 shown in FIG. 1 includes both a client-side portion (e.g., client-side module 102) and a server-side portion (e.g., server-side module 106). In some embodiments, data processing is implemented as a stand-alone application installed on client device 104. In addition, the division of functionalities between the client and server portions of client environment data processing can vary in different embodiments. For example, in some embodiments, client-side module 102 is a thin-client that provides only user-facing input and output processing functions, and delegates all other data processing functionalities to a backend server (e.g., server system 108).

Figure 2:
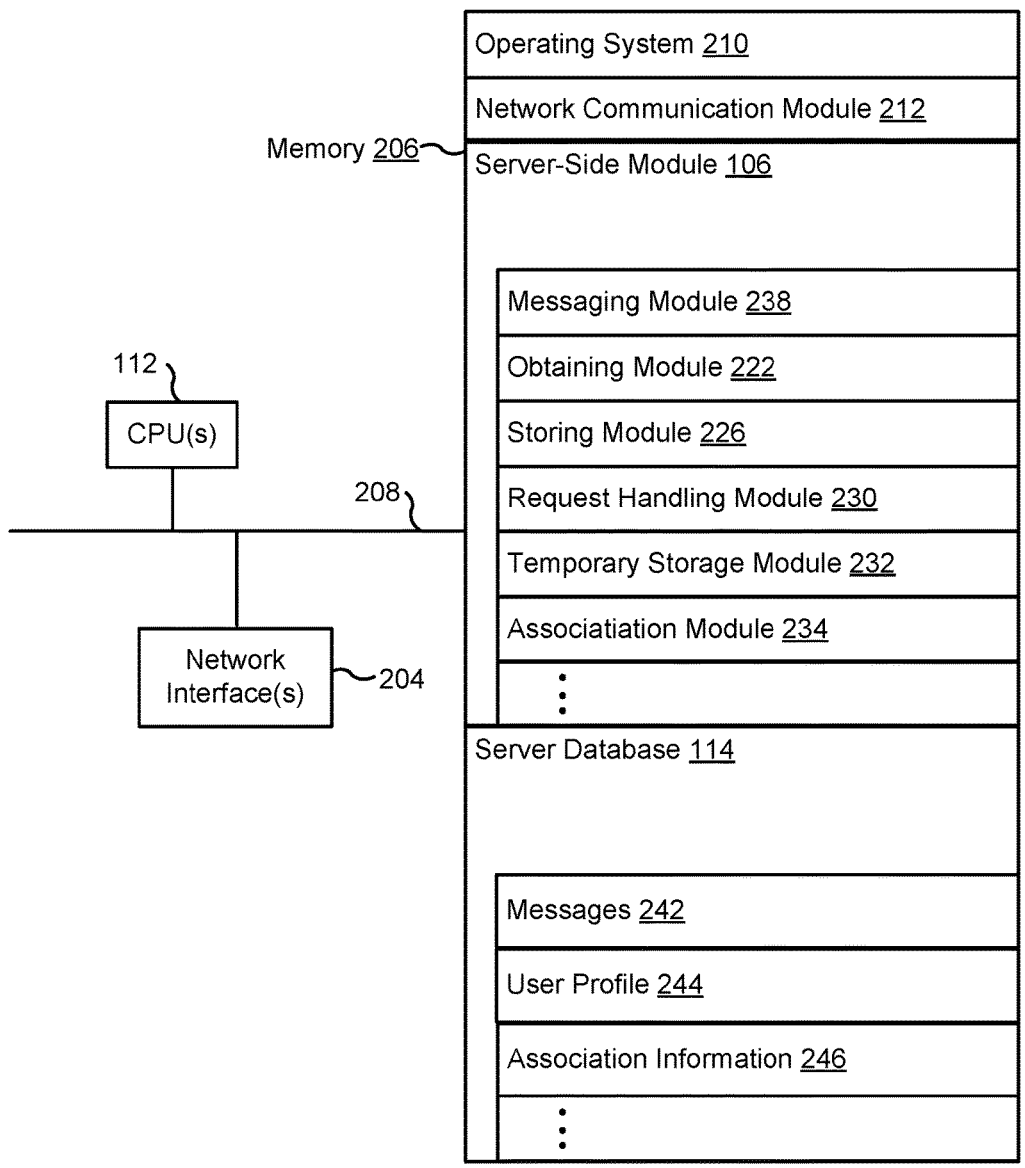
FIG. 2 is a block diagram of a server system in accordance with some embodiments.

FIG. 2 is a block diagram illustrating a server system 108 in accordance with some embodiments. Server system 108, typically, includes one or more processing units (CPUs) 112, one or more network interfaces 204 (e.g., including I/O interface to one or more clients 118 and I/O interface to one or more external services 120), memory 206, and one or more communication buses 208 for interconnecting these components (sometimes called a chipset).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

operating system 210 including procedures for handling various basic system services and for performing hardware dependent tasks;

network communication module 212 for connecting server system 108 to other computing devices (e.g., client devices 104 and external service(s) 122) connected to one or more networks 110 via one or more network interfaces 204 (wired or wireless);

server-side module 106, which provides server-side data processing for the social networking platform (e.g., instant messaging and social networking services), includes, but is not limited to:

messaging module 238 for processing and routing instant messages exchanged among a first user and one or more second users of a social networking platform;

obtaining module 222 for obtaining identity information of the first user from a client device 104 associated with the first user;

storing module 226 for storing various information in the database 114, the various information including message histories, service categories, server provider names, and entries relevant to the instant messages exchanged during a chat session;

request handling module 230 for handling and responding to various requests sent from client devices of the social networking platform;

temporary storage module 232 for temporarily storing message inputs received in a first client device and restoring the message inputs to a first or a second client device; and association module 234 for receiving associations among messages and message inputs; and one or more server database 114 storing data for the social networking platform, including but not limited to:

messages 242 storing messages in various formats exchanged among a plurality of users, including their timing, content and format;

user profiles 244 storing user profiles for the plurality of users, wherein a respective user profile for a user may include a user/account name or handle, login credentials to the social networking platform, payment data (e.g., linked credit card information, app credit or gift card balance, billing address, shipping address, etc.), custom parameters (e.g., age, location, hobbies, etc.) for the user, social network contacts, groups of contacts to which the user belongs, and identified trends and/or likes/dislikes of the user; and association information 246 storing association information among messages, including associations among messages, timing information of receiving and releasing messages, and association preference of users.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
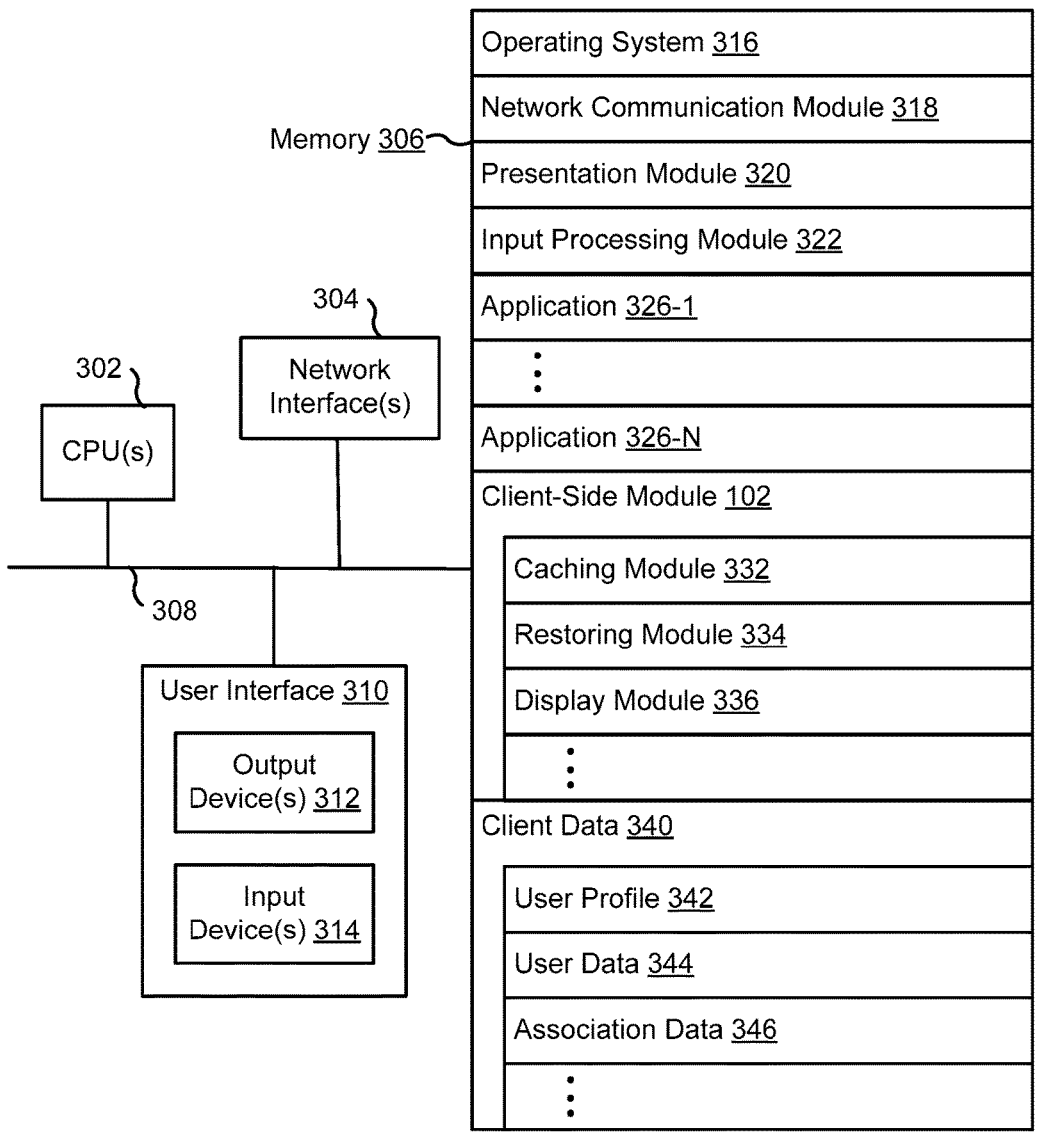
FIG. 3 is a block diagram of a client device in accordance with some embodiments.

FIG. 3 is a block diagram illustrating a representative client device 104 associated with a user in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 104 use a microphone and voice recognition or a camera and gesture recognition to supplement or replace the keyboard.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

operating system 316 including procedures for handling various basic system services and for performing hardware dependent tasks;

network communication module 318 for connecting client device 104 to other computing devices (e.g., server system 108 and external service(s) 122) connected to one or more networks 110 via one or more network interfaces 304 (wired or wireless);

presentation module 320 for enabling presentation of information (e.g., a user interface for a social networking platform, widget, webpage, game, and/or application, audio and/or video content, text, etc.) at client device 104 via one or more output devices 312 (e.g., displays, speakers, etc.) associated with user interface 310;

input processing module 322 for detecting one or more user inputs or interactions from one of the one or more input devices 314 and interpreting the detected input or interaction;

one or more applications 326-1-326-N for execution by client device 104 (e.g., games, application marketplaces, payment platforms, social network platforms, and/or other applications); and client-side module 102, which provides client-side data processing and functionalities for managing chat messages, including but not limited to:

caching module 332 for presenting options for caching the message inputs and caching message inputs;

restoring module 334 for restoring message inputs to the conversation interfaces; and display module system 336 for displaying messages in conversation interfaces in accordance with associations between outgoing messages and incoming messages in addition to the message receipt and message release time; and client data 340 storing data of a user associated with the client device, including, but is not limited to:

user profile 342 storing a user profile associated with the user of client device 104 including a user/account name or handle, payment data (e.g., linked credit card information, app credit or gift card balance, billing address, shipping address, etc.), custom parameters (e.g., age, location, hobbies, etc.) for the user, social network contacts, groups of contacts to which the user belongs, and identified trends and/or likes/dislikes of the user;

user data 344 storing data authored, saved, liked, or chosen as favorites by the user of client device 104 in a social networking platform; and association information 346 storing associations between outgoing messages and incoming messages.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and different configurations of the modules for implementing the functions described herein are possible in various embodiments.

Figure 4A:
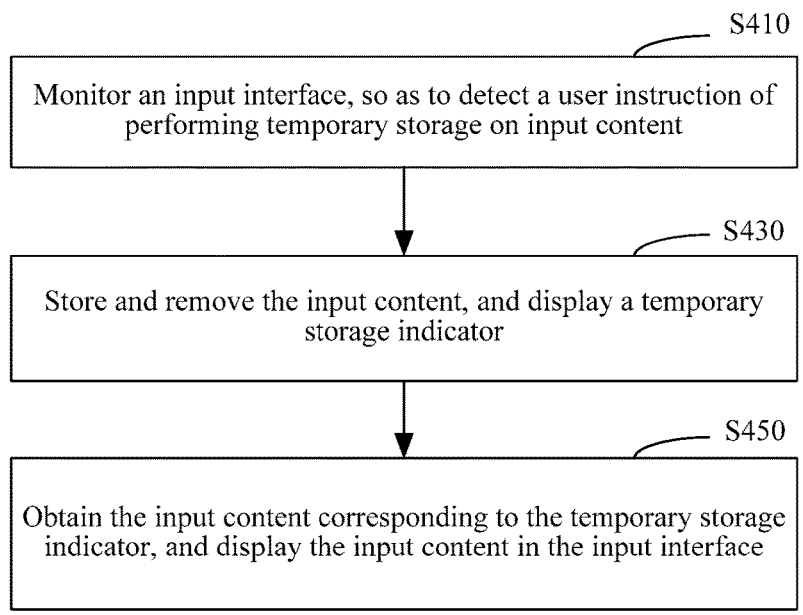
FIG. 4A is a flowchart of a temporary storage method for input content in accordance with some embodiments.

As shown in FIG. 4A, in some embodiments, a temporary storage method for input content (also referred to as an message input caching method) includes the following steps.

Step 410: Monitor an input interface, so as to detect a user instruction of performing temporary storage (also referred to as an "input caching instruction").

In accordance with some embodiments, the input interface is an operation interface provided by a client. For example, the input interface may be an operation interface in an instant messaging client and configured to input a message, or may also be an operation interface in a twitter client and configured to input twitter content. The input content may be a text, voice, a picture, an emotion, a video, or the like.

The input interface is monitored, so as to detect various user operations. In some embodiments, the user instruction of performing the temporary storage on the input content is detected. The input content is content input by a user in the input interface by using an input box (e.g., a text input box for typing the text of a text message, or a voice input interface that captures the voice message input of a voice message). The input box or voice input interface are provided in a region of the user interface that is separate from the region that displays the messages that are already sent during the chat session between the user and the other party or parties of the conversation.

Step 430: Store and remove the input content corresponding to the user instruction, and display a temporary storage indicator (also referred to as an "input cache indicator") corresponding to the input content.

In accordance with some embodiments, the input content corresponding to the user instruction may be all input content included in the input interface (e.g., all input currently entered in the input box, or the whole recording segment captured before the caching instruction), or may also be a part of input content included in the input interface (e.g., whole words input only).

In some embodiments, the input content is cleared from the user interface and cached. The temporary storage indicator corresponding to the cached input content is displayed in the input interface, so that a user knows that there is input content being temporarily stored. The temporary storage indicator (also referred to as "an input cache indicator") also provides an operation ingress for the temporarily stored content. The number of temporary storage indicators in the input interface may be multiple, and there is cached input content uniquely corresponding to each temporary storage indicator, as illustrated in FIG. 6K (e.g., indicators 640 and 642 (labeled "1" and "2", respectively) each correspond to a respective cached message input entered at two different times during the chat session). By selecting a respective one of the indicators 604 and 640, the corresponding cached message input will be brought out of storage and presented in the input region. The user may choose to delete the input from the input region, modify it, or rewrite it completely before sending it by issuing the message release instruction (e.g., by selecting the "send" button) when the message input in the message input region is satisfactory to the user.

For a current input interface, the input box is cleared, and the user can input according to the will of the user. For example, the user can enter a new message in the input region and send it out. The user can restore the original input content in the input box by selecting the temporary storage indicator as needed. Selecting the temporary storage indicator when there is unsent message input in the input box causes the unsent message input to be cached and cleared from the input box, and causes the message input corresponding to the selected indicator to be retrieved from storage and presented in the cleared input box, in some embodiments.

Step 450: Obtain, according to a selection of the temporary storage indicator, the input content corresponding to the temporary storage indicator, and display the input content in the input interface.

In accordance with some embodiments, a selection of the temporary storage indicator is received may be a clicking operation performed by the user on the temporary storage indicator.

According to the foregoing process, in a case in which the user temporarily does not need the input content currently included in the input interface, the user can clear the input content from the input interface and cache the input content, so that the input content can return to the input interface again when needed.

Figure 4B:
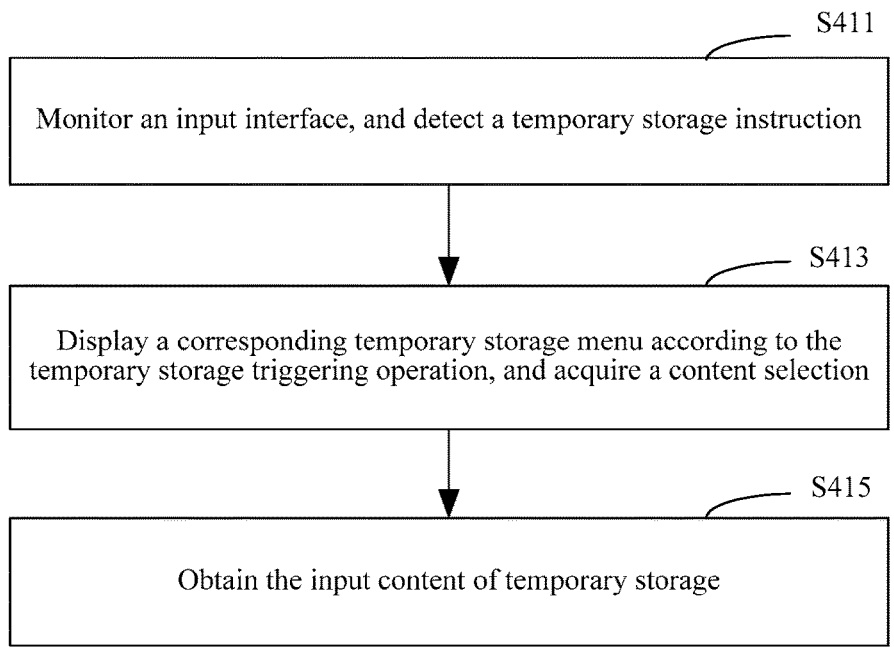
FIG. 4B is a flowchart of a temporary storage method for input content in accordance with some embodiments.

As shown in FIG. 4B, in some embodiments, the foregoing step 410 includes:

Step 411: Monitor the input interface, and detect a temporary storage instruction corresponding to the input content. In accordance with some embodiments, the temporary storage instruction may be a long pressing operation on the input content.

Step 413: Display a corresponding temporary storage menu according to the temporary storage instruction, and receive a content selection.

In accordance with some embodiments, after a temporary storage instruction is detected, a corresponding temporary storage menu is popped up in the input interface.

Further, the temporary storage menu includes a temporary storage button and a "select all" button, and the content selection is used to select and temporarily store the input content included in the input interface.

For example, after a user triggers the temporary storage instruction to pop up the temporary storage menu, operations of select-all and cutting are performed on the input content by successively clicking the temporary storage button and the "select all" button in the temporary storage menu. Sometimes, the user can choose to select only portions of the input content and cache only the selected portions.

Step 415: Obtain, according to the content selection operation, the input content of temporary storage.

Figure 4C:
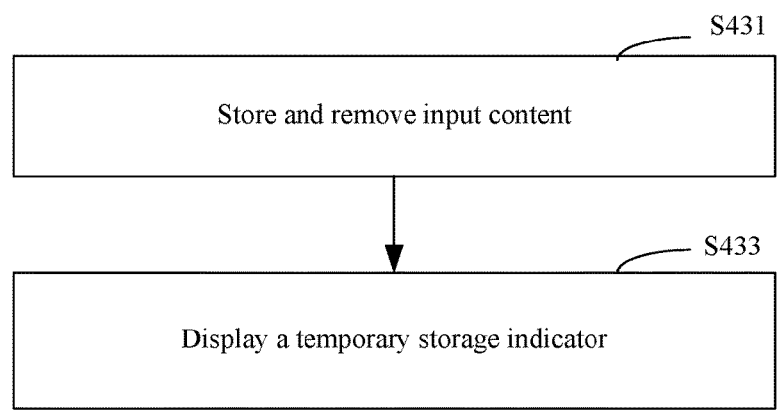
FIG. 4C is a flowchart of a temporary storage method for input content in accordance with some embodiments.

As shown in FIG. 4C, in some embodiments, the foregoing step 430 includes the following steps.

Step 431: Store and remove the input content corresponding to the user instruction in the input interface, so as to cache the input content.

In accordance with some embodiments, the input content displayed in the input box is cleared and is locally cached or is cached in a server, so that the input content can be conveniently obtained again at a later time. In some embodiments, the cached content is stored locally at the client device.

Step 433: Display the temporary storage indicator corresponding to the cached input content.

In accordance with some embodiments, the input content cached each time is uniquely corresponding to a temporary storage indicator, and with the input content cached each time, a temporary storage indicator corresponding to caching of the input content this time is displayed in the input interface.

Figure 4D:
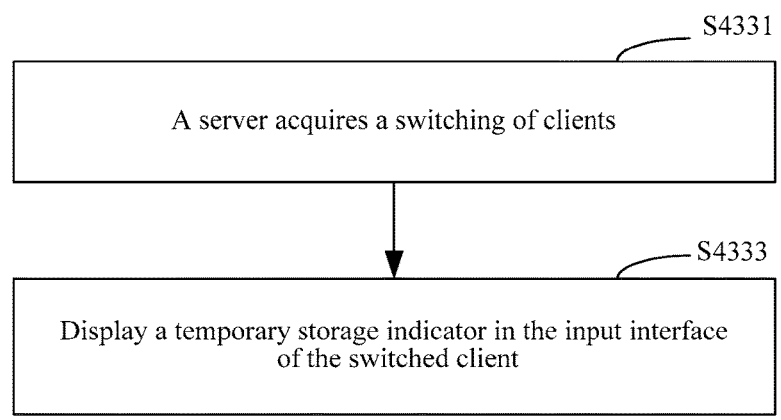
FIG. 4D is a flowchart of a temporary storage method for input content (also referred to as "a message input caching method") in accordance with some embodiments.

As shown in FIG. 4D, in some embodiments, the input content is cached in the server, and the foregoing step 433 includes:

Step 4331: The server acquires a switched client side and receives entering input region instruction.

In accordance with some embodiments, temporarily stored input content can be cached in the server or the local client. In some embodiments, the client is an instant messaging client, and a user identifier is used for distinguishing the input content cached in the server. The input content is stored in the server in a manner of being corresponding to the user identifier.

In some embodiments, when a user switches from a first client device to a second client device, the server will be able to provide the temporarily stored content corresponding to the user identifier from the second client device.

Step 4333: Display the temporary storage indicator of the switched client according to the switching operation.

In accordance with some embodiments, the user can obtain the temporarily stored input content again even though the user switches the client device.

For example, a user first uses an instant messaging application of a mobile phone to input a message. Then the message input in the chat window removed and cached into the server, and is stored in a manner of being corresponding to a corresponding user identifier. In this case, the user changes to use an instant messaging client of a tablet computer to chat with the same friend. When the user switches to the instant messaging client of the tablet computer and opens a chat window between the user and the friend, the server obtains, according to the user identifier, message cached by the user. Then the temporary storage indicator is displayed in the chat window in the tablet computer. This way, if the user prefers to enter a message input using a different device after the user has started composing the message input, the message input already entered can be stored at the server, and the user can bring back the cached message input when he is logged onto the server using the desired device at a later time.

In some embodiments, before step 450, the foregoing method further includes: with the input content corresponding to the temporary storage indicator displayed in the input interface, clearing the temporary storage indicator.

In some embodiments, the temporary storage indicator (and the content corresponding to the mark) may be stored in the input interface for repeated use.

Figure 6A:
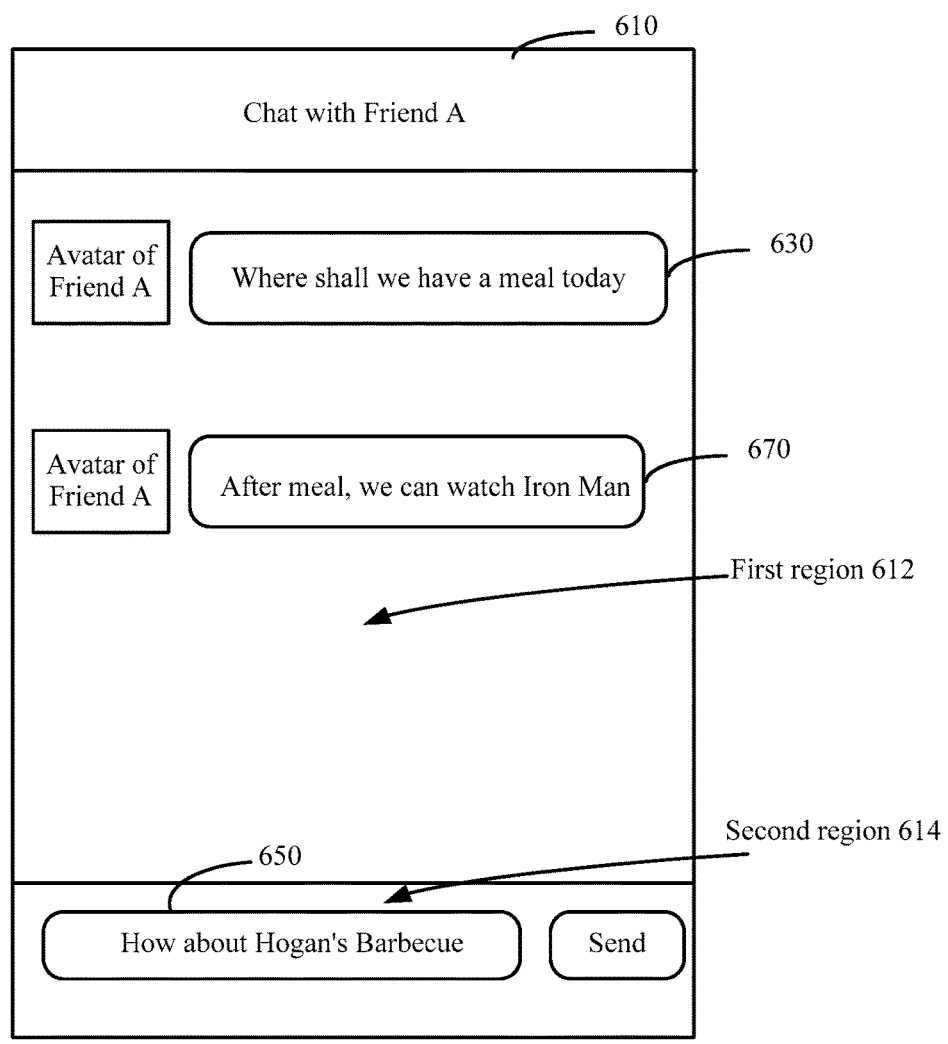
FIGS. 6A-6K are schematic diagrams of user interfaces of example chat sessions between a user and friend A in accordance with some embodiments.
Figure 6B:
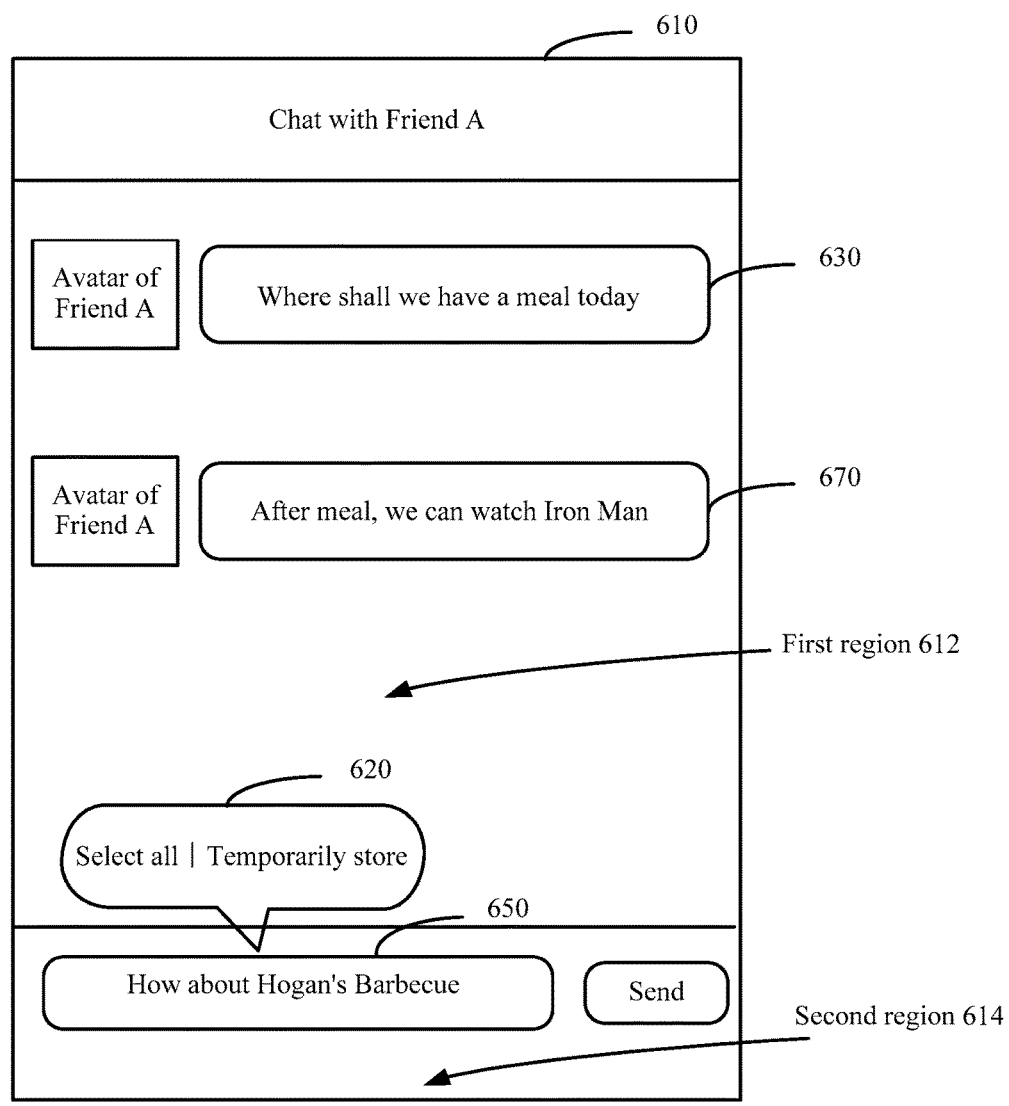
Figure 6C:
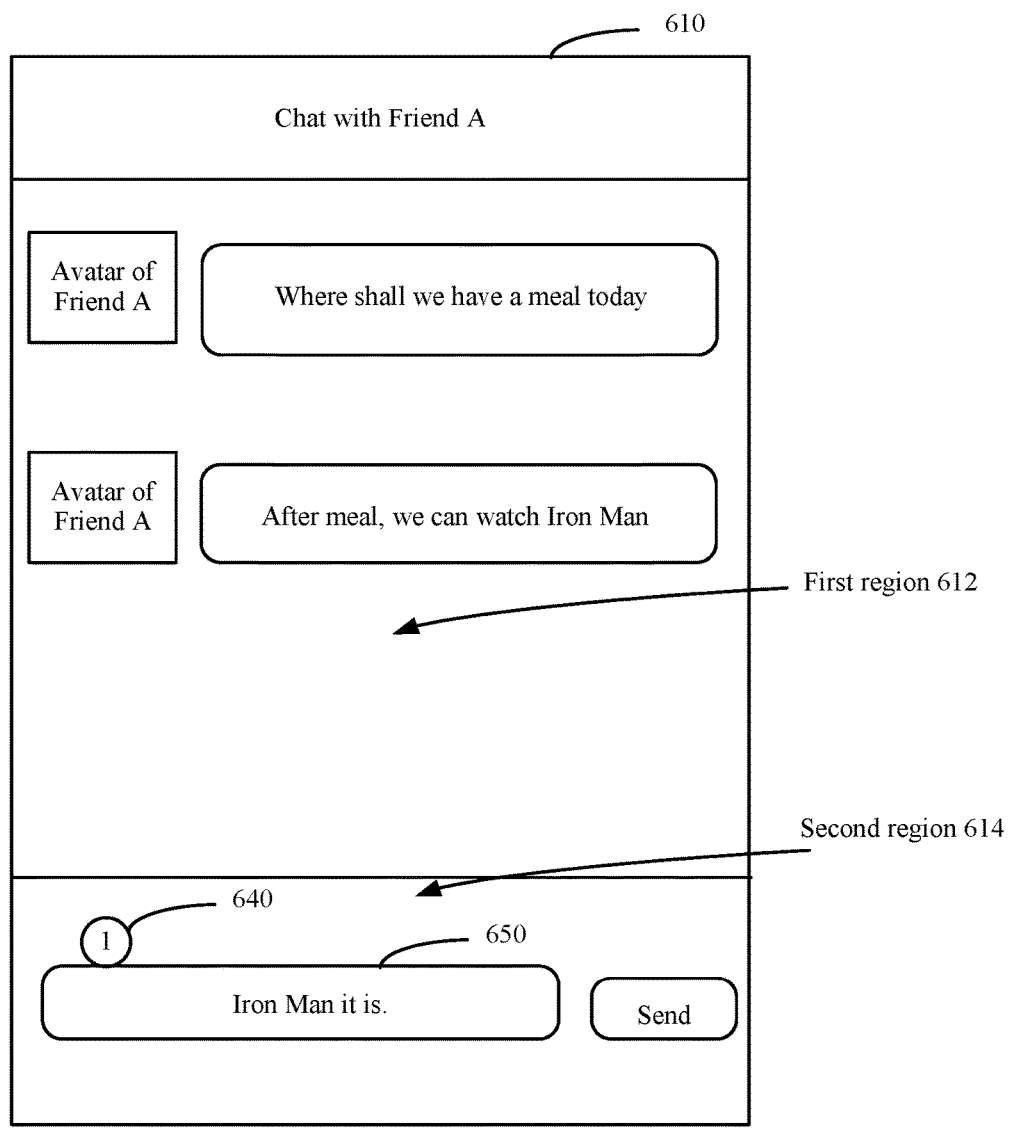
Figure 6D:
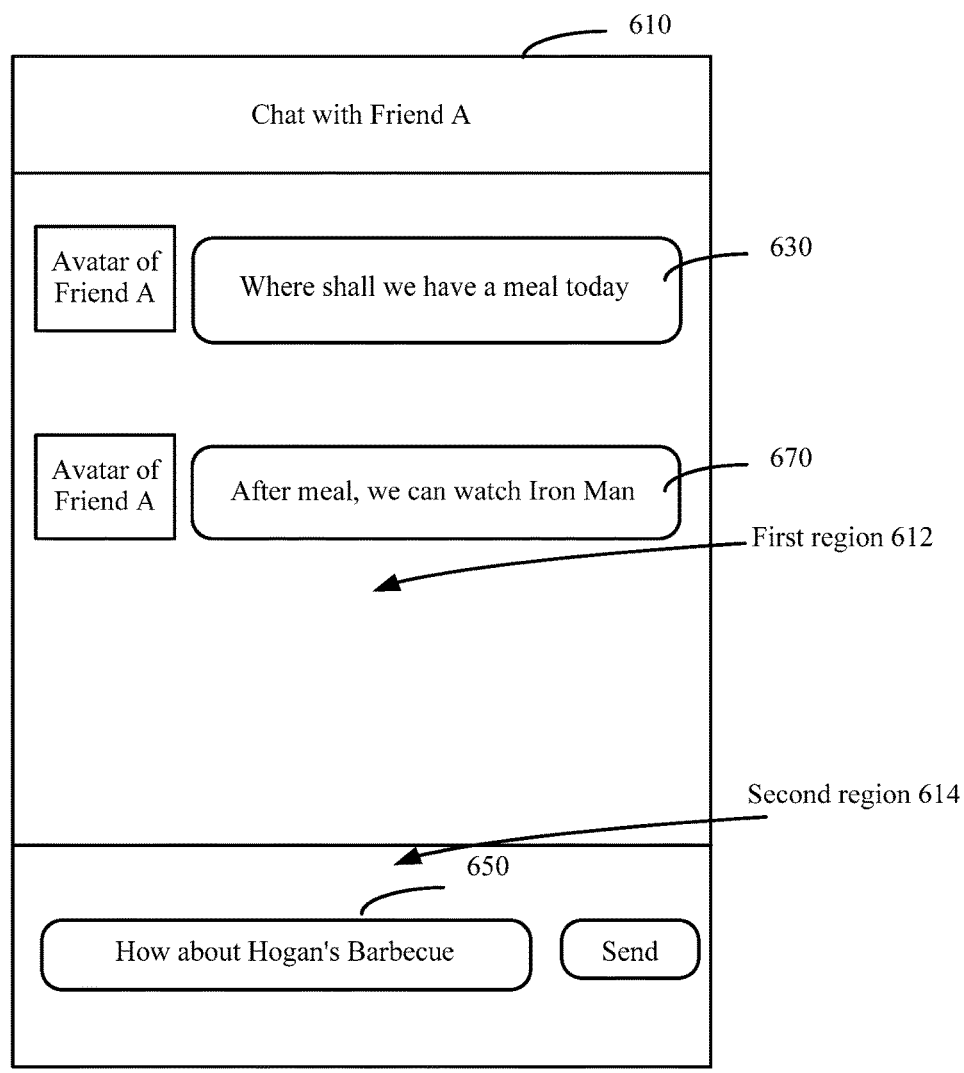
Figure 6E:
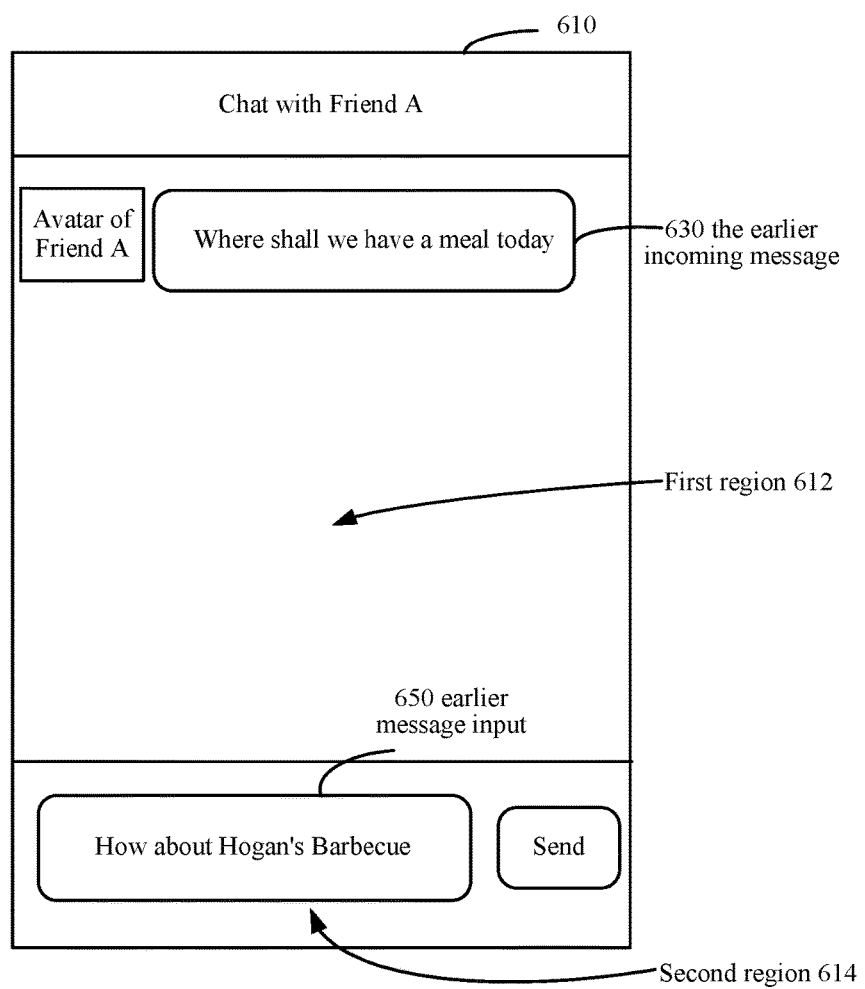
Figure 6F:
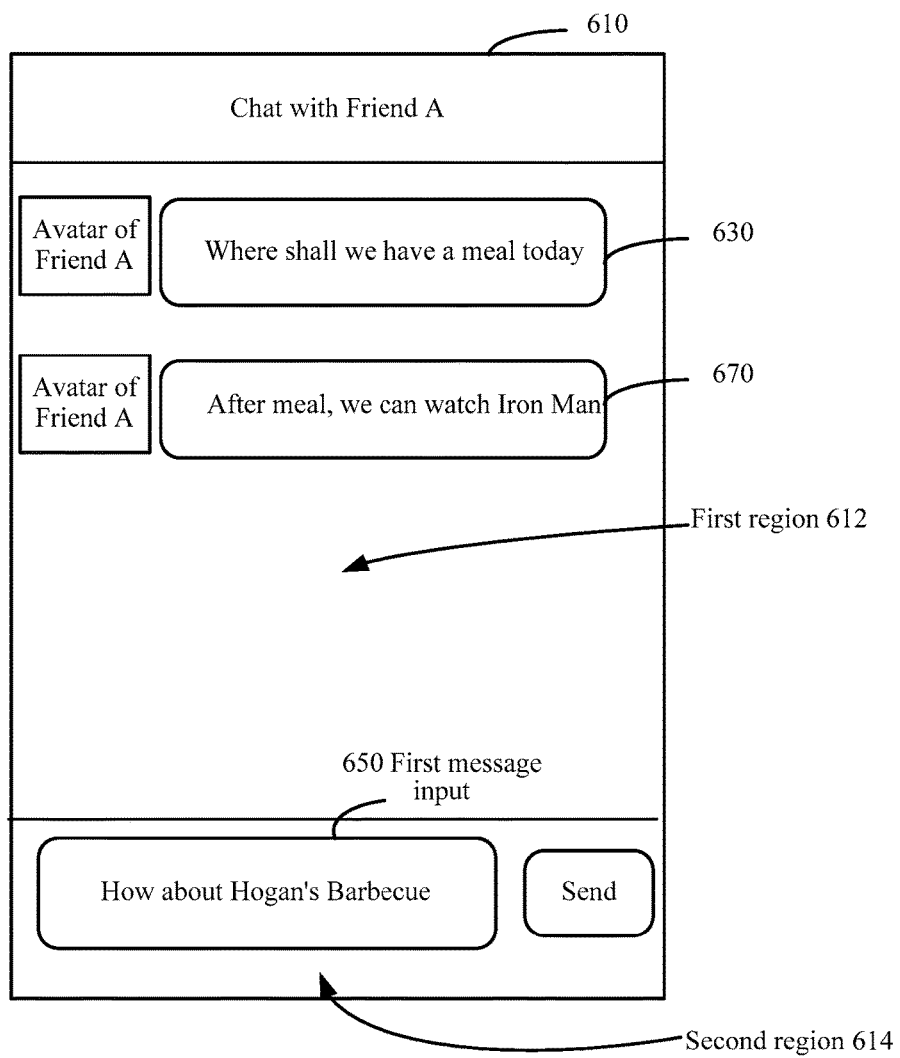
Figure 6G:
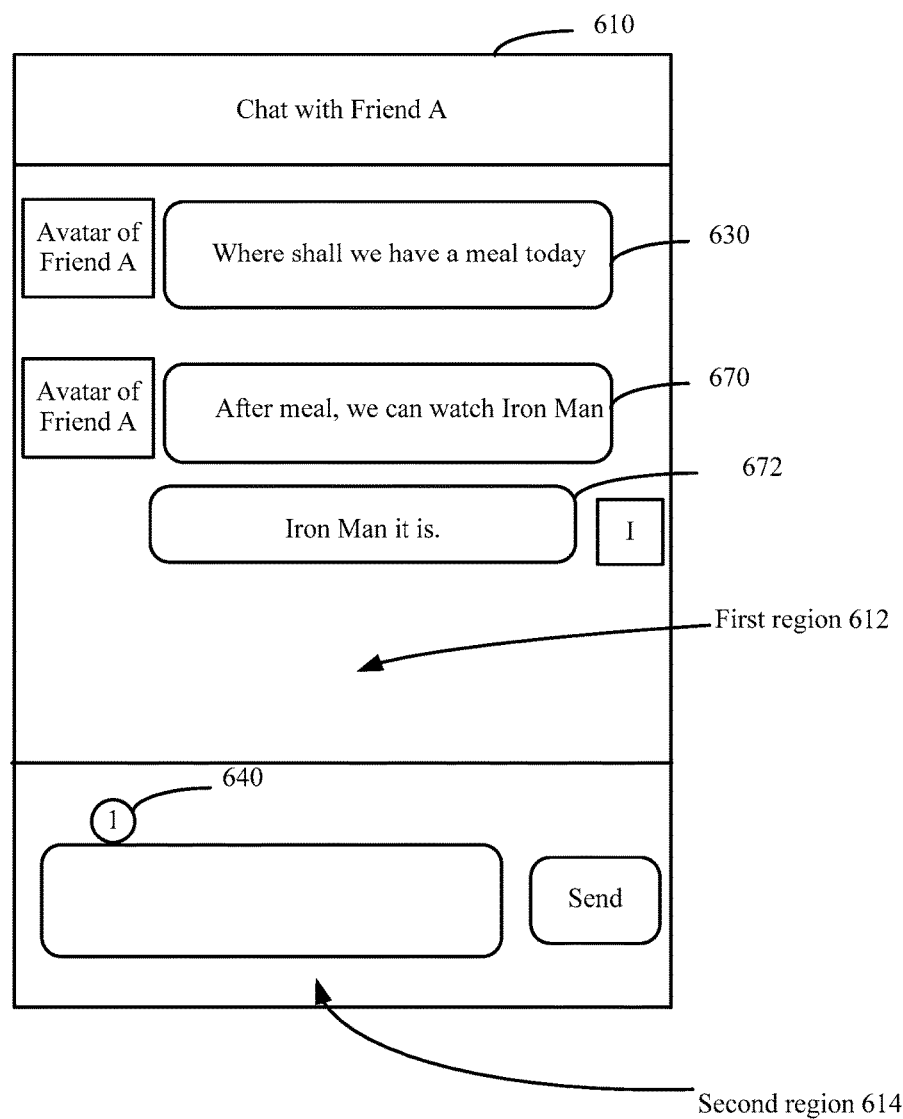
Figure 6H:
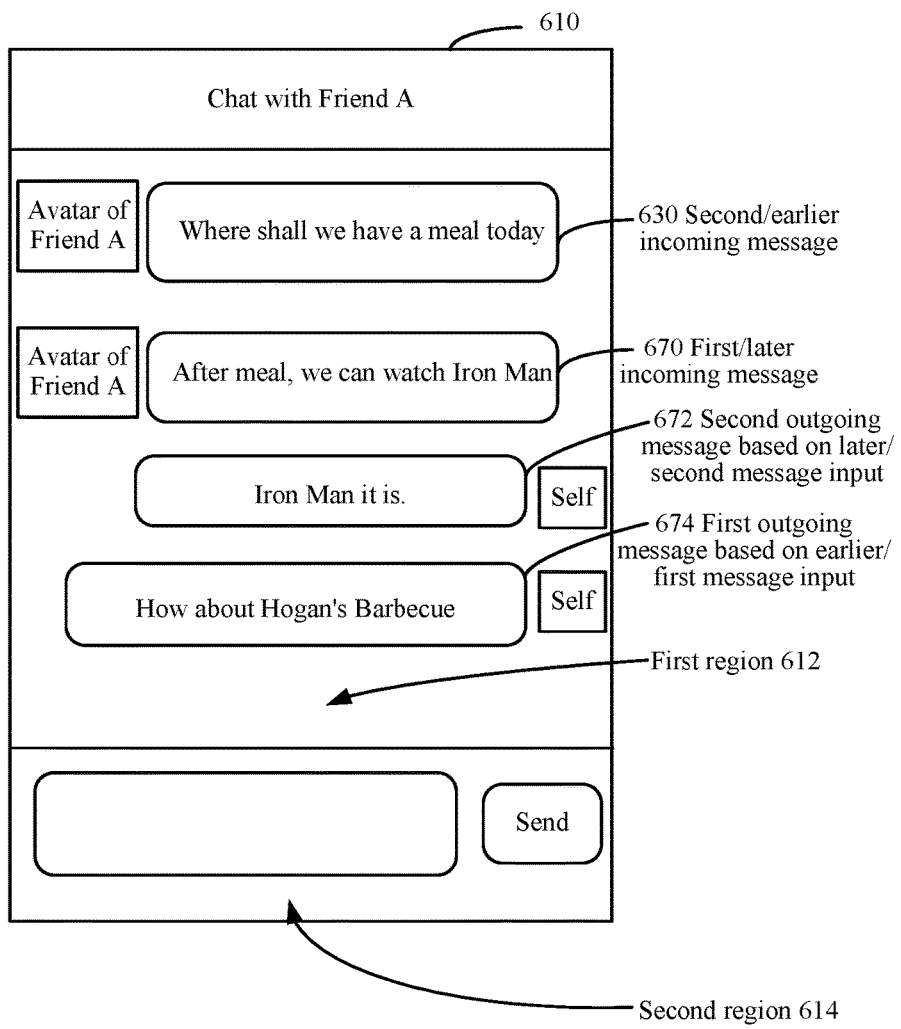
Figure 6I:
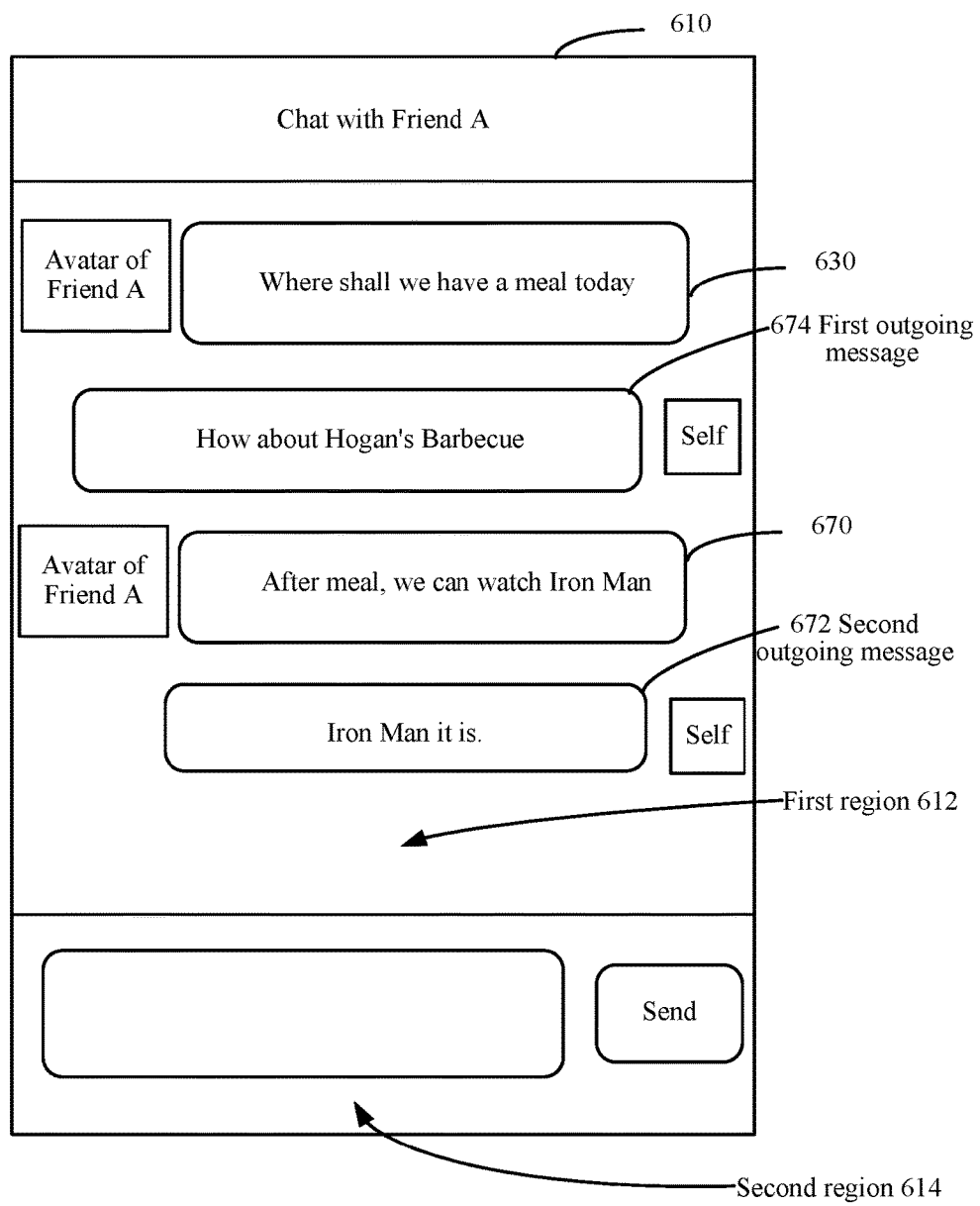
Figure 6J:
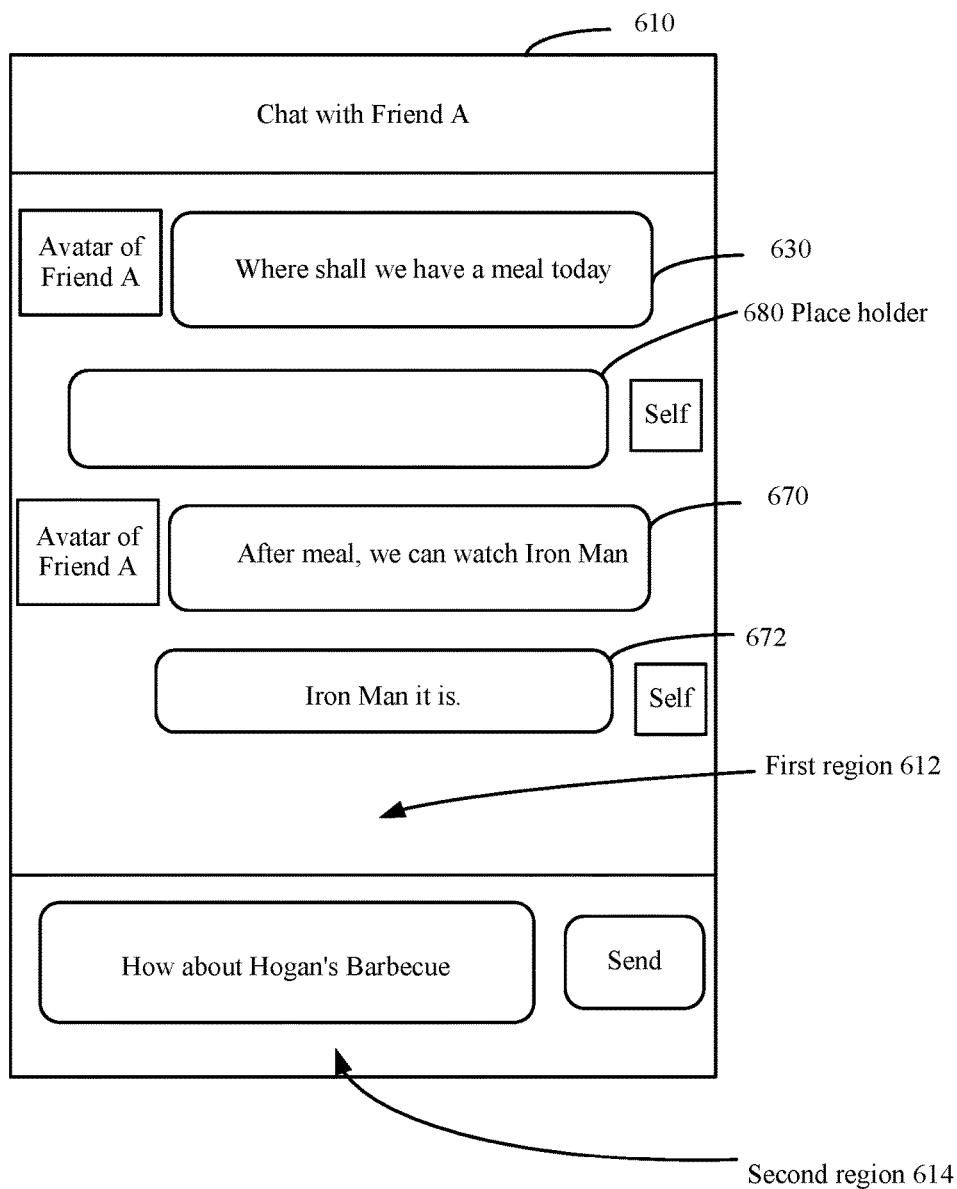
Figure 6K:
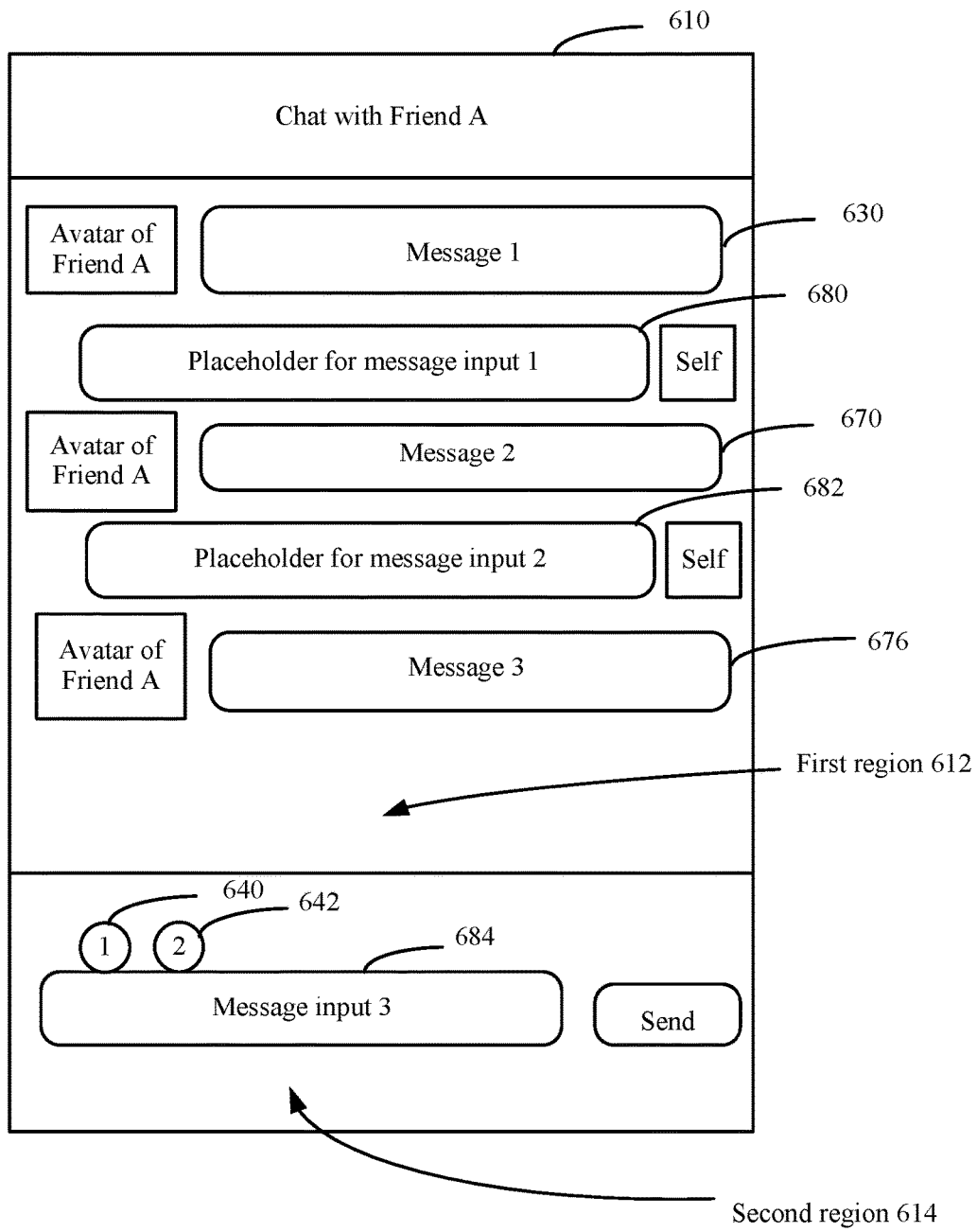

FIGS. 6A-6K illustrate chat windows through which a user is discussing with a friend. FIG. 6A shows that a user has a dialogue with Friend A through a chat interface 610. The user is replying to a message 630 (e.g., "Where shall we have a meal today?") sent by friend A, inputting content of "How about Hogan's Barbecue" in an input box 650. The input box 650 is displayed within a second region 614 of the user interface 610, separate from a first region 612 displaying the past messages (e.g., message 630) exchanged between the user and Friend A.

At this moment, right before the user presses the "send button" in the second region, the user receives another message 670 (e.g., "After meal, we can watch Iron Man") from Friend A. The user intends to reply to this message first. Therefore, the user issues a message input caching instruction to cause the message input in input box 650 to go into temporary storage.

As shown in FIG. 6B, in some embodiments, after the instant messaging client of the mobile phone obtains the temporary storage instruction (also referred to as the "input caching instruction") in the chat window 610, a corresponding temporary storage menu 620 pops up, and after a content selection is acquired, the input content in the input box 650 is locally cached in the instant messaging client of the mobile phone. The content selection operation on the temporary storage menu 620 includes a temporary storage button clicking operation and a "select all" button clicking operation. If the user selects the "select all" button, the message input is selected, and the user can perform the regular cut or copy operation on the input, and use the copied input for another app or for a next message. If the user selects the "temporarily store" (or "cache") operation, the message input in the input box 650 is cached, and the message input is cleared from the input box 650. In some embodiments, the menu 620 includes other options, such as copy, cut, select, etc. In some embodiments, the menu 620 needs not be presented, and the input caching is performed by default after the input caching instruction is received from the user. In some embodiments, the input caching instruction is provided by the user pressing the input box and hold for a predetermined length of time. In some embodiments, the user interface 610 optionally provides a user interface element for caching input that the user can select by tapping on the user interface element. In some embodiments, the user interface 610 optionally detects a predetermined touch gesture provided by the user for caching the message input currently in the input box. In some embodiments, the user interface optionally provide a user interface element for caching the message input locally at the client device, or on the server. If the message input is cached on the server, the user has the option to retrieve the cached message input on a different client device later on.

In some embodiments, with the input box 650 in the window 610 cleared, a temporary storage indicator 640 (also referred to as a "cache indicator") is displayed above the input box 650, so that the user can obtain content of the cached message input later, as shown in FIG. 6C. In FIG. 6C, the user has entered a new message input ( "e.g., Iron Man it is ") in the input box 650.

Later (e.g., after zero or more other messages are prepared and sent by the user), when the user wants to use the cached input content, the user obtains the cached content by selecting the temporary storage indicator 640. Then the cached content is displayed in the input box 650 again, which is shown in FIG. 6D. In this example, the user decided not to send the message "Iron Man it is", and brought back the cached message input "How about Hogan's Barbecue" before the message "Iron Man it is" is sent out. In some embodiments, if the user decides to send the message "Iron Man it is" before the message input "How about Hogan's Barbecue" is retrieved from storage, the message "Iron Man it is" would be sent out to Friend A, and displayed below the message 670 in the user interface 610. In some embodiments, the user can cache the message input "Iron Man it is " in the same way that he/she cached the earlier message input "Iron Man it is" before he/she brings back the earlier cached input "How about Hogan's Barbecue."

Figure 5:
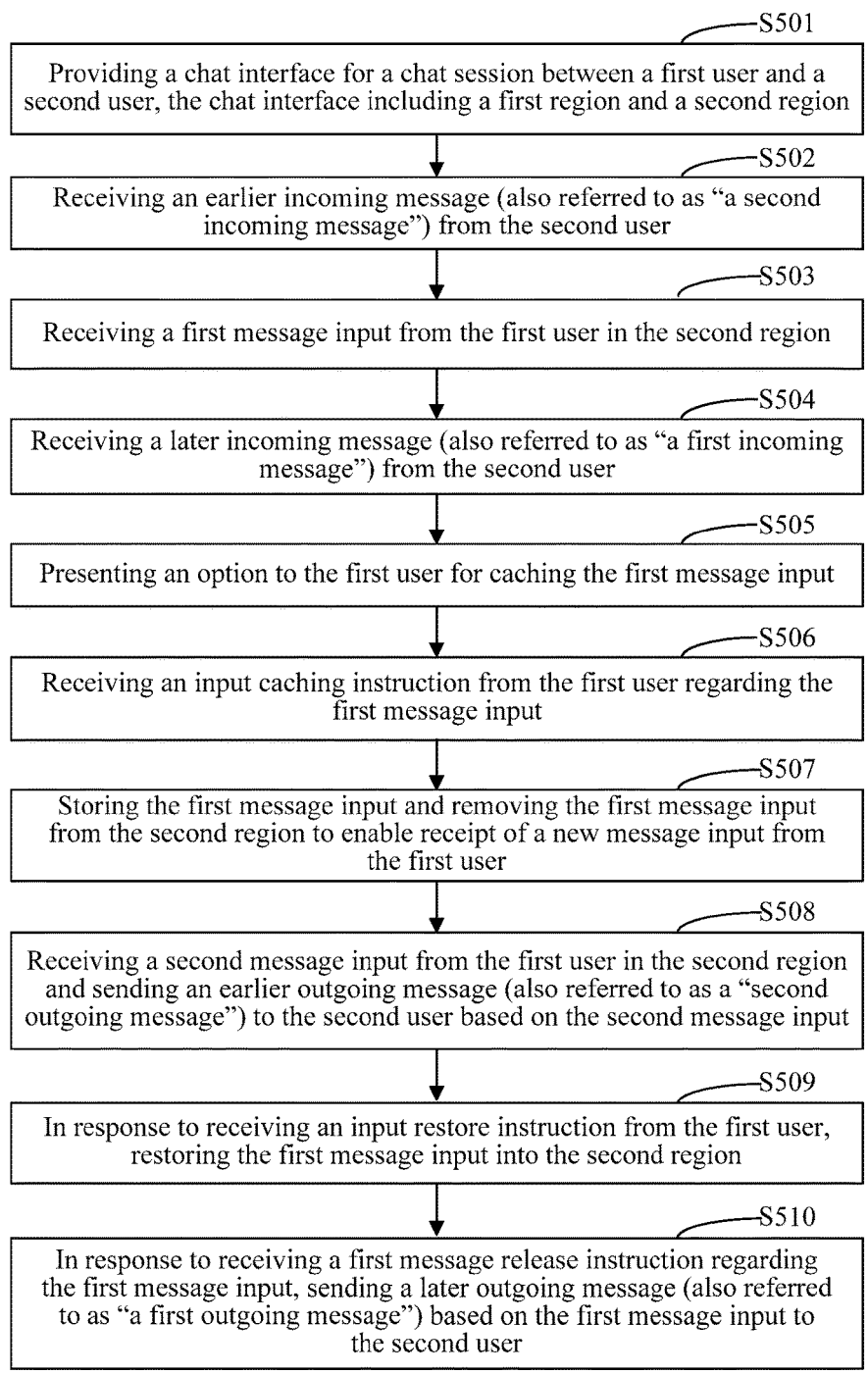
FIG. 5 is a flowchart of an input caching method in accordance with some embodiments.

FIG. 5 is a flowchart of a method of managing chat messages in a social network application in accordance with some embodiments. In some embodiments, the method is performed at a first user device (e.g., a client device 140 in FIGS. 1 and 3) of having one or more processors and memory for storing one or more programs to be executed by the one or more processors.

In accordance with some embodiments, in a step S501, the first user device provides a chat interface for a chat session between a first user and a second user, the chat interface including a first region for displaying past chat messages from each of the first and the second user, and a second region for receiving a current message input from the first user. FIG. 6A illustrates a first region 612 which includes zero or more past incoming and outgoing messages, and a second region 612 which includes an input box 650 for inputting a message input in accordance with some embodiments.

In accordance with some embodiments, in a step S502, the first user device receives at least an earlier incoming message (referred to as "a second incoming message" in the claims) from the second user. For example, message 630 is the earlier (second) incoming message as shown in FIG. 6E.

In accordance with some embodiments, in a step S503, the first user device receives a first message input (this is the earlier message input that would be cached) from the first user in the second region. In some embodiments, this second region can be used to receive text input or speech input, or other types of input, such as drawings, and other types of inserts, e.g., news articles, photos, locations, name cards, etc. For example, the first message input could be the message input 650 as shown in FIG. 6E.

In accordance with some embodiments, in a step S504, after receiving the first message input and before receiving any message release instruction from the first user regarding the first message input, the first user device receives a first incoming message (this is the later incoming message) from the second user. For example, the first incoming message could be the message 670 as shown in FIG. 6F. Please note that, in some embodiments, it does not matter whether the first user or the second user initiating the chat session. One of the scenarios of the application is that the first message input is interrupted by the arrival of a new message, either with or without an earlier incoming message being displayed in the message history.

In accordance with some embodiments, in response to receiving the first incoming message, the first user device displays the first incoming message in the first region. In some embodiments, in a step S505, automatically, without user intervention, the first user device presents an option to the first user for caching the first message input in accordance with some embodiments. For example, the option is a temporary storage menu as shown in FIG. 6B. The automatic presentation of the message input caching option is based on the trigger that a current message input has been started, and a new incoming message has been received before the current message input is sent out as a new outgoing message. In some embodiments, the trigger condition also requires that an earlier incoming message was received immediately before the current message input was started.

In some embodiments, the user may disregard the option for caching the first message input and continue with the first message input and ultimately send out a message based on the first message input. If, however, the user decides to cache the first message input, the user can enter a message caching instruction, e.g., by selecting the message caching option presented in the user interface. In some embodiments, in a step S506, in response to presenting the option for caching the first message input, the first user device receives an input caching instruction from the first user regarding the first message input. In some embodiments, the input caching instruction is a user instruction of performing temporary storage on input content described in FIGS. 6A-6D and accompanying text.

In accordance with some embodiments, in a step S507, in response to receiving the input caching instruction, the first user device stores the first message input, and removes the first message input from the second region to enable receipt of a new message input from the first user. FIG. 6C shows that the first message input is cached and the second message input is received.

Therefore, in some embodiments, the first incoming message is received after the second incoming message, and the first message input is received from the first user after the first incoming message is received from the second user.

In accordance with some embodiments, in a step S508, the first user device receives a second message input and sends the second message input as the second outgoing message. Specifically, in some embodiments, after removing the first message input from the second region in response to receiving the input caching instruction, and before receiving the input restore instruction from the first user regarding the cached first message input: the first user device receives a second message input from the first user in the second region, as shown in FIG. 6C. FIG. 6C shows a second message input "Iron Man it is." in the second region and the user is about to click "send" to give the second message release instruction. FIG. 6C further includes an indicator 640 which shows that the first message input "How about Hogan's Barbecue" has been stored. Then the first user device receives a second message release instruction regarding the second message input received in the second region (e.g., by pressing the "send" button while the second message input is displayed in the second region, and the first message input is cached). In response to receiving the second message release instruction from the first user regarding the second message input, the first user device sends a second outgoing message to the second user based on the second message input, and displays the second outgoing message 672 in the first region, as shown in FIG. 6G.

In accordance with some embodiments, in a step S509, the first user device receives an input restore instruction from the first user and restores the first message input, e.g., by clicking indicator 640 illustrated in FIG. 6G. In some embodiments, after storing the first message input and removing the first message input from the second region, the first user device receives an input restore instruction from the first user regarding the cached first message input. In response to receiving the input restore instruction from the first user, the first user device restores the first message input into the second region. FIG. 6D shows that the first message input is restored without sending a second outgoing message first. FIG. 6H shows that the first message input is restored after a second outgoing message 672 was sent out first.

In accordance with some embodiments, the first user device is configured to concurrently store more than one cached message input, and selection of a particular one of the one or more cached message inputs causes the selected cached message input to be restored in the second region. In some embodiments, each of the cached message inputs is associated with a respective incoming message displayed in the first region, and selection of the particular cached message input is optionally accomplished by the selection of the respective incoming message associated with the particular cached message input in the first region. In some embodiments, the user can also directly select a respective indicator of a particular cached input displayed in the chat window to recall it into the message input box. For example, FIG. 6K shows that two message inputs have been cached, corresponding to temporary storage indicator 1 and 2, respectively. When the user wants to restore a particular one of the cached message inputs, the user can do so by selecting the corresponding indicator of the cached message input. In some embodiments, the correspondence between a past incoming message and a cached message input can be indicated in the user interface by some common visual characteristic (e.g., same color, hue, boarder, etc.) of the past incoming message and its corresponding cached message input.

In accordance with some embodiments, in a step S510, the first user device sends the first outgoing message based on the restored first message input. In some embodiments, after restoring the first message input into the second region, the first user device receives a first message release instruction from the first user regarding the first message input (e.g., a signal indicating selection of the "send" button when the first message input is restored and displayed in the second region). In response to receiving the first message release instruction, the first user device sends a first outgoing message (e.g., message 674) based on the first message input to the second user and displays the first outgoing message (e.g., message 674 in FIG. 6H) in the first region.

In accordance with some embodiments, after restoring the first message input into the second region, the first user device receives one or more modifications to the first message input from the first user. Then the first user device modifies the first message input in accordance with the one or more modifications received from the first user and the first outgoing message is based on the modified first message input. For example, after restoring the first message input "How about Hogan's Barbecue" in the first region, the first user continues to type "? My sister strongly recommends it." in the first region and sends the outgoing message "How about Hogan's Barbecue? My sister strongly recommends it." The user may also delete all or portions of the original first message input before sending it out. For example, the user may revise the restored first message input by changing "Hogan's" to "Hogen's" before pressing the "send" button.

In some embodiments, the first outgoing message (e.g., message 674) is displayed after the first incoming message (e.g., message 670). For example, messages are displayed in chronological order of message release times (for outgoing messages) and message receipt times (for incoming messages), as shown in FIG. 6H. FIG. 6H shows the first incoming message (e.g., message 670), the second incoming message (e.g., message 630), the first outgoing message (e.g., message 674) and the second outgoing message (e.g., message 672) are displayed in the first region according to a chronological order of message receipt or release time.

In some embodiments, the first outgoing message (e.g., message 674) is displayed before the first incoming message (e.g., message 670). In some embodiments, the first outgoing message (e.g., message 674) is inserted between the second incoming message (e.g., message 630) and the first incoming message (e.g., message 670) in accordance with a start time of the first message input (e.g., message input 650) relative to respective receipt times of the second and first incoming messages. For example, messages are displayed in chronological order of users beginning to enter the message, as shown in FIG. 6I.

In some embodiments, the second incoming message (e.g., message 630) is the last incoming message received before the first message input (e.g., message input 650) is received in the second region. In response to the input caching instruction, the first user device associates the second incoming message (e.g., message 630) with the first message input (e.g., message input 650). In some embodiments, the association is configured to cause a future outgoing message (e.g., message 674) based on the cached first message input to be displayed in the first region at a location immediately below the second incoming message (e.g., message 630). Therefore, after caching the first message input (e.g., message input 650), the first user device displays an indication of the association between the cached first message input (e.g., message input 650) and the second incoming message (e.g., message 630).

In some embodiments, the first user could actively seek to associate a current message input with an incoming message. In some embodiments, the first user device receives a first selection input selecting the second incoming message (e.g., message 630) displayed in the first region (e.g., while the first message input 650 is displayed in the second region); and in response to the selection of the first incoming message (message 630), associating the first message input (e.g., message input 650) with the second incoming message (e.g., message 630).

After restoring the first message input into the second region, the first user device receives a user input releasing the association between the first message input and the second incoming message. In some embodiments, the release of the association causes the first outgoing message (e.g., message 674) to be displayed below both the second incoming message (e.g., message 630) and the first incoming message (e.g., message 670) according to the chronological order of message receipt or release time, as illustrated in FIG. 6H. In some embodiments, the association is a toggle switch, and selection of the message associated with a restored message input (while the message input is displayed in the second region) causes the association between the message and the message input to dissolve.

For example, when the association is created, the second incoming message (e.g., message 630) can be highlighted with a thicker boarder indicating its association with the cached input (e.g., cached message input 650). If the user selects the second incoming message, then the association is released. The first outgoing message based on the first message input is displayed at a location in accordance with chronological order of message release/receipt times. If the user does not release the association, then the first outgoing message (e.g., message 674) is inserted before the first incoming message (e.g., message 670), and immediately below the second incoming message (e.g., message 630), as illustrated in FIG. 6I. In some embodiments, if the user does not release the association, the second user device displays messages in the same order, by which the first outgoing message (e.g., message 674) is inserted before the first incoming message (e.g., message 670), and immediately below the second incoming message (e.g., message 630), as illustrated in FIG. 6I. In some embodiments, when the second user associates some messages in similar manners, the association is reflected in the order of messages displayed in the first user device as well.

In accordance with some embodiments, while the message input is displayed in the second region (e.g., either a freshly entered message, or a restored message input from cache), in response to receiving the first selection input selecting the second incoming message (e.g., message 630), the first user device displays a placeholder message (e.g., placeholder message 680 in FIG. 6J) in the first region at a location immediately below the second incoming message (e.g., message) and above the first incoming message. In various embodiments, a placeholder message can be an empty message bubble, a message bubble showing an ellipse, a message bubble that looks different from the rest of the message bubbles, or other icons representing a placeholder for a cached message input. In some embodiments, the placeholder message can be displayed immediately after the caching instruction is received, or after the association is made. FIG. 6J shows a place holder 680. In some embodiments, the first user device displays the first outgoing message at the location of the placeholder message in the first region once the message release instruction for the first message input is received.

In accordance with some embodiments, after associating the first message input with the second incoming message and storing the first message input, the first user could restore the first message input by selecting the second incoming message in the first region. In some embodiments, the first user device receives a second selection selecting the second incoming message in the first region by the first user, and in response to the second selection of the second incoming message by the first user, restores the first message input in the second region for further editing or release.

In accordance with some embodiments, in the first region, the first user device displays a message history in which past messages are displayed in a chronological order of message receipt time or message release time. In some embodiments, the first user device receives a message reordering instruction for re-ordering the past messages in the message history. In some embodiments, the message reordering instruction can be a toggle input, and just switch between the two ordering modes when entered. In response to the user instruction, the first user device re-orders messages in accordance with one or more respective associations between outgoing messages and incoming messages in addition to the message receipt and message release time. In some embodiments, the two ordering modes includes (1) purely chronological, and (2) chronological adjusted by message association. In some embodiments, if the message order is adjusted by message association, the timestamps of the affected neighboring messages are shown in the user interface.

Therefore, there are multiple ways of associating a message input with an incoming message, by time or by user selections. By associating the message input, the user can enter the input one by one, rather being interrupted by the incoming messages received during the conversations. In addition, displaying messages in accordance with association makes it easier for participants of the conversation to understand the messages by providing context information of the messages.

Figure 7A:
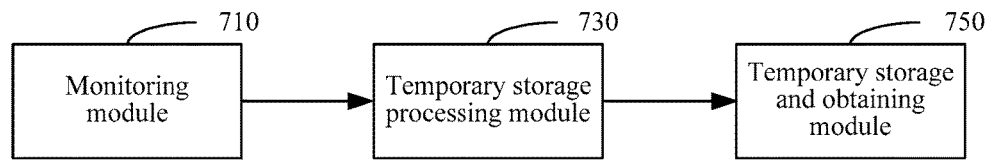
FIGS. 7A-7D are schematic structural diagrams of a device in accordance with some embodiments.

As shown in FIG. 7A, in some embodiments, a temporary storage apparatus for input content includes a monitoring module 710, a temporary storage processing module 730, and a temporary storage and obtaining module 750.

The monitoring module 710 is configured to monitor an input interface, and obtain a user instruction of performing the temporary storage on the input content.

The temporary storage processing module 730 is configured to store and remove the input content corresponding to the user instruction, and display a temporary storage indicator.

In accordance with some embodiments, the temporary storage processing module 730 can perform temporary storage for the input content, and can clear and cache input content in the input interface.

The temporary storage and obtaining module 750 is configured to obtain the input content corresponding to the temporary storage indicator, and display the input content in the input interface.

In accordance with some embodiments, the temporary storage and obtaining module 750 is configured to receive a selection of the temporary storage indicator.

Figure 7B:
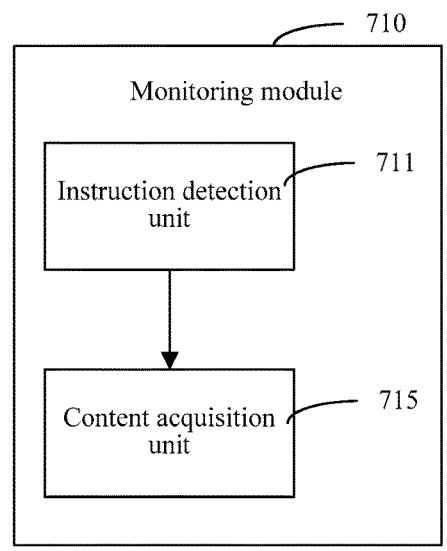

As shown in FIG. 7B, in some embodiments, the foregoing monitoring module 710 includes an instruction detection unit 711, a content obtaining unit 713, and a content acquisition unit 715.

The instruction detection unit 711 is configured to monitor the input interface, and detect a temporary storage instruction.

The content obtaining unit 713 is configured to display a corresponding temporary storage menu according to the temporary storage instruction, and acquire a content selection operation on the temporary storage menu.

In accordance with some embodiments, after a temporary storage instruction is detected, the content obtaining unit 713 pops up a corresponding temporary storage menu in the input interface.

The content acquisition unit 715 is configured to obtain the input content according to the content selection operation.

Figure 7C:
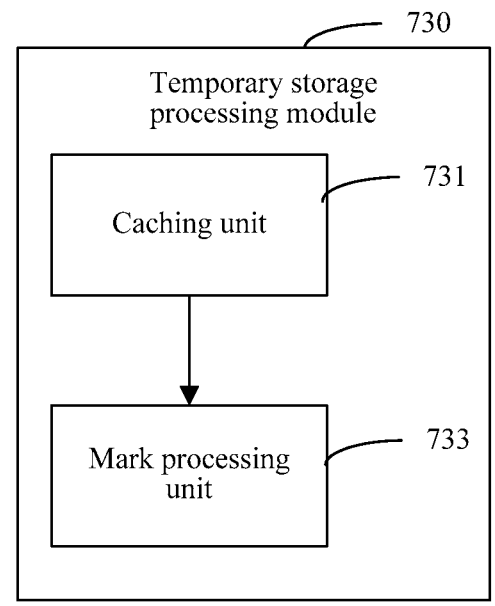

As shown in FIG. 7C, in some embodiments, the foregoing temporary storage processing module 730 includes a caching unit 731 and a mark processing unit 733.

The caching unit 731 is configured to store and remove the input content so as to cache the input content.

In accordance with some embodiments, the caching unit 731 clears input content displayed in the input box of the input interface, and locally caches the input content or caches the input content in a server.

The mark processing unit 733 is configured to display the temporary storage indicator.

Figure 7D:
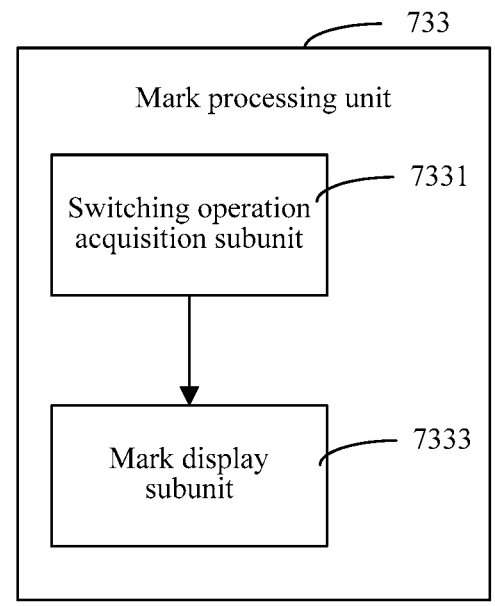

As shown in FIG. 7D, in some embodiments, the input content is cached in the server, and the foregoing mark processing unit 733 includes a switching operation acquisition subunit 7331 and a mark display subunit 7333.

The switching operation acquisition subunit 7331 is configured to acquire a switching operation of switching a client.

In accordance with some embodiments, each client application corresponds to a unique client identifier. The switching operation acquisition subunit 7331 in the server learns, according to a change of a client identifier, that the user switches the client.

The mark display subunit 7333 is configured to display the temporary storage indicator of the switched client according to the switching operation While particular embodiments are described above, it will be understood it is not intended to limit the technology to these particular embodiments. On the contrary, the technology includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the technology to the precise forms disclosed. Many modifications and variations are possible in view of the above teachings. The embodiments were chosen and described in order to best explain the principles of the technology and its practical applications, to thereby enable others skilled in the art to best utilize the technology and various embodiments with various modifications as are suited to the particular use contemplated.

What is claimed is:

1. A method of managing chat messages in a social network application, comprising:
    at a user device having one or more processors and memory for storing one or more programs to be executed by the one or more processors:
        providing a chat interface for a chat session between a first user and a second user, the chat interface including a first region for displaying past chat messages from each of the first and the second user, and a second region for receiving a current message input from the first user;
        receiving a first message input from the first user in the second region;
        after receiving the first message input and before receiving any message release instruction from the first user regarding the first message input, receiving a first incoming message from the second user;
        in response to receiving the first incoming message:
            displaying the first incoming message in the first region; and
            automatically, without user intervention, presenting an option to the first user for caching the first message input;
        in response to presenting the option for caching the first message input, receiving an input caching instruction from the first user regarding the first message input; and
        in response to receiving the input caching instruction:
            storing the first message input and a correspondence between the first message input and a past incoming message displayed in the first region; and
            removing the first message input from the second region to enable receipt of a new message input from the first user,
        after storing the first message input and removing the first message input from the second region, receiving a selection operation from the first user in the first region;
        detecting that the selection operation is directed to the past incoming message displayed in the first region; and
        restoring the first message input into the second region based on the correspondence between the first message input and the past incoming message.

2. The method of claim 1, further comprising:
    after restoring the first message input into the second region, receiving a first message release instruction from the first user regarding the first message input; and
    in response to receiving the first message release instruction:
        sending a first outgoing message based on the first message input to the second user; and
        displaying the first outgoing message in the first region.

3. The method of claim 2, further comprising:
    after restoring the first message input into the second region:
        receiving one or more modifications to the first message input from the first user; and
        modifying the first message input in accordance with the one or more modifications received from the first user, wherein the first outgoing message is based on the modified first message input.

4. The method of claim 3, further comprising:
    receiving at least a second incoming message from the second user,
    wherein:
        the first incoming message is received after the second incoming message, and
        the first message input is received from the first user after the first incoming message is received from the second user.

5. The method of claim 3, further comprising:
    after removing the first message input from the second region in response to receiving the input caching instruction, and before receiving, from the first user, the selection operation directed to the past incoming message displayed in the first region:
        receiving a second message input from the first user in the second region;
        receiving a second message release instruction regarding the second message input received in the second region; and
        in response to receiving the second message release instruction from the first user regarding the second message input:
            sending a second outgoing message to the second user based on the second message input; and
            displaying the second outgoing message in the first region.

6. The method of claim 3, wherein the first outgoing message is inserted between the second incoming message and the first incoming message in accordance with a start time of the first message input relative to respective receipt times of the second and first incoming messages.

7. A device for managing chat messages in a social network application, comprising:
    one or more processors; and
    memory storing one or more programs for execution by the one or more processors, the one or more programs including instructions for:
        providing a chat interface for a chat session between a first user and a second user, the chat interface including a first region for displaying past chat messages from each of the first and the second user, and a second region for receiving a current message input from the first user;

receiving a first message input from the first user in the second region;

after receiving the first message input and before receiving any message release instruction from the first user regarding the first message input, receiving a first incoming message from the second user;

in response to receiving the first incoming message:
displaying the first incoming message in the first region; and
automatically, without user intervention, presenting an option to the first user for caching the first message input;

in response to receiving the input caching instruction:
storing the first message input and a correspondence between the first message input and a past incoming message displayed in the first region; and
removing the first message input from the second region to enable receipt of a new message input from the first user,
after storing the first message input and removing the first message input from the second region, receiving a selection operation from the first user in the first region;
detecting that the selection operation is directed to the past incoming message displayed in the first region; and
restoring the first message input into the second region based on the correspondence between the first message input and the past incoming message.

8. The device of claim 7, wherein the operations further comprise:
after restoring the first message input into the second region, receiving a first message release instruction from the first user regarding the first message input; and
in response to receiving the first message release instruction:
sending a first outgoing message based on the first message input to the second user; and
displaying the first outgoing message in the first region.

9. The device of claim 8, wherein the operations further comprise:
after restoring the first message input into the second region:
receiving one or more modifications to the first message input from the first user;
modifying the first message input in accordance with the one or more modifications received from the first user, wherein the first outgoing message is based on the modified first message input.

10. The device of claim 9, wherein the operations further comprise:
receiving at least a second incoming message from the second user,
wherein:
the first incoming message is received after the second incoming message, and
the first message input is received from the first user after the first incoming message is received from the second user.

11. The device of claim 9, wherein the operations further comprise:
after removing the first message input from the second region in response to receiving the input caching instruction, and before receiving, from the first user, the selection operation directed to the past incoming message displayed in the first region:

receiving a second message input from the first user in the second region;

receiving a second message release instruction regarding the second message input received in the second region;

in response to receiving the second message release instruction from the first user regarding the second message input:
sending a second outgoing message to the second user based on the second message input; and
displaying the second outgoing message in the first region.

12. The device of claim 9, wherein the first outgoing message is inserted between the second incoming message and the first incoming message in accordance with a start time of the first message input relative to respective receipt times of the second and first incoming messages.

13. A non-transitory computer readable storage medium having instructions stored thereon, the instructions, when executed by one or more processors, cause the processors to perform operations comprising:
providing a chat interface for a chat session between a first user and a second user, the chat interface including a first region for displaying past chat messages from each of the first and the second user, and a second region for receiving a current message input from the first user;

receiving a first message input from the first user in the second region;

after receiving the first message input and before receiving any message release instruction from the first user regarding the first message input, receiving a first incoming message from the second user;

in response to receiving the first incoming message:
displaying the first incoming message in the first region; and
automatically, without user intervention, presenting an option to the first user for caching the first message input;

in response to presenting the option for caching the first message input, receiving an input caching instruction from the first user regarding the first message input; and in response to receiving the input caching instruction:
storing the first message input and a correspondence between the first message input and a past incoming message displayed in the first region; and
removing the first message input from the second region to enable receipt of a new message input from the first user,
after storing the first message input and removing the first message input from the second region, receiving a selection operation from the first user in the first region;
detecting that the selection operation is directed to the past incoming message displayed in the first region; and
restoring the first message input into the second region based on the correspondence between the first message input and the past incoming message.

14. The non-transitory computer readable storage medium of claim 13, wherein the operations further comprise:
after restoring the first message input into the second region, receiving a first message release instruction from the first user regarding the first message input; and in response to receiving the first message release instruction:
　　sending a first outgoing message based on the first message input to the second user; and
　　displaying the first outgoing message in the first region.

15. The non-transitory computer readable storage medium of claim 14, wherein the operations further comprise:
　　after restoring the first message input into the second region:
　　　　receiving one or more modifications to the first message input from the first user;
　　　　modifying the first message input in accordance with the one or more modifications received from the first user, wherein the first outgoing message is based on the modified first message input.

16. The non-transitory computer readable storage medium of claim 15, wherein the operations further comprise:
　　receiving at least a second incoming message from the second user,
　　wherein:
　　　　the first incoming message is received after the second incoming message, and
　　　　the first message input is received from the first user after the first incoming message is received from the second user.

17. The non-transitory computer readable storage medium of claim 15, wherein the operations further comprise:
　　after removing the first message input from the second region in response to receiving the input caching instruction, and before receiving, from the first user, the selection operation directed to the past incoming message displayed in the first region:
　　　　receiving a second message input from the first user in the second region;
　　　　receiving a second message release instruction regarding the second message input received in the second region;
　　　　in response to receiving the second message release instruction from the first user regarding the second message input:
　　　　　　sending a second outgoing message to the second user based on the second message input; and
　　　　　　displaying the second outgoing message in the first region.

\* \* \* \* \*

UNITED STATES PATENT AND TRADEMARK OFFICE
CERTIFICATE OF CORRECTION

| | |
|---|---|
| PATENT NO. | : 10,225,215 B2 |
| APPLICATION NO. | : 15/165598 |
| DATED | : March 5, 2019 |
| INVENTOR(S) | : Wen Zha |

It is certified that error appears in the above-identified patent and that said Letters Patent is hereby corrected as shown below:

In the Claims

In Claim 7, Column 19, Line 10, "automatically, without user intervention, presenting an option to the first user for caching the first message input;" should be -- automatically, without user intervention, presenting an option to the first user for caching the first message input; in response to presenting the option for caching the first message input, receiving an input caching instruction from the first user regarding the first message input; and --.

Signed and Sealed this
Thirtieth Day of April, 2019

Andrei Iancu
*Director of the United States Patent and Trademark Office*